US011315144B2

(12) United States Patent
Parana Sanches

(10) Patent No.: US 11,315,144 B2
(45) Date of Patent: Apr. 26, 2022

(54) METHOD FOR EVALUATING THE EFFECTIVENESS OF COMMUNICATION, ADVERTISING AND PROMOTIONS IN COMMUNICATION MEDIA, METHOD FOR DEVELOPING OPTIMIZED MEDIA PLANS AND METHOD FOR PURCHASING OPTIMIZED MEDIA

(71) Applicant: Rodrigo Parana Sanches, São Paulo (BR)

(72) Inventor: Rodrigo Parana Sanches, São Paulo (BR)

( * ) Notice: Subject to any disclaimer, the term of this patent is extended or adjusted under 35 U.S.C. 154(b) by 0 days.

(21) Appl. No.: 16/960,725

(22) PCT Filed: Jan. 8, 2019

(86) PCT No.: PCT/BR2019/050009
§ 371 (c)(1),
(2) Date: Jul. 8, 2020

(87) PCT Pub. No.: WO2019/134023
PCT Pub. Date: Jul. 11, 2019

(65) Prior Publication Data
US 2020/0357019 A1    Nov. 12, 2020

(30) Foreign Application Priority Data
Jan. 8, 2018   (BR) ...................... 10 2018 000436 0

(51) Int. Cl.
*G06Q 30/00*    (2012.01)
*G06Q 30/02*    (2012.01)
*G06N 5/04*    (2006.01)

(52) U.S. Cl.
CPC ..... *G06Q 30/0244* (2013.01); *G06Q 30/0205* (2013.01); *G06Q 30/0245* (2013.01);
(Continued)

(58) Field of Classification Search
CPC ....................................... G06Q 30/0207–0277
See application file for complete search history.

(56) References Cited

U.S. PATENT DOCUMENTS 4,833,607 A     5/1989  Dethloff et al.
11,159,909 B2 * 10/2021  Anderson ............ H04W 4/021
(Continued)

OTHER PUBLICATIONS

Wray, Jeffrey, et al. "Mobile Advertising Engine for Centralized Mobile Coupon Delivery." Global Conference on Business and Finance Proceedings, vol. 5, No. 2, pp. 586-594, 2010. (Year: 2010).*

(Continued)

*Primary Examiner* — Luis A Brown
(74) *Attorney, Agent, or Firm* — B. Aaron Schulman, Esq.; Stites & Harbison, PLLC

(57) ABSTRACT

The present invention relates to methods for evaluating the effectiveness of all types of communication carried on offline communication media so as to generate data equivalent to the data obtained in online communication media. The present invention uses tangible tools such as fixed-line telephones, cellphones, computers, tablets and any other wearable mobile device to generate that data that will be used in media plans that are much more precise and efficient than the plans currently known. Finally, the present invention relates to said media plan obtained using one of said methods as well as the purchase of optimized media.

14 Claims, 1 Drawing Sheet

(52) U.S. Cl.
CPC ..... *G06Q 30/0246* (2013.01); *G06Q 30/0249* (2013.01); *G06Q 30/0273* (2013.01); *G06N 5/04* (2013.01); *G06Q 30/0238* (2013.01)

(56) References Cited

U.S. PATENT DOCUMENTS

| | | | | |
|---|---|---|---|---|
| 2007/0038516 | A1* | 2/2007 | Apple | G06Q 30/02 |
| | | | | 705/14.42 |
| 2007/0241189 | A1* | 10/2007 | Slavin | G06Q 30/02 |
| | | | | 235/383 |
| 2008/0027810 | A1* | 1/2008 | Lerner | G06Q 30/02 |
| | | | | 705/14.25 |
| 2008/0091516 | A1* | 4/2008 | Giunta | G06Q 30/0204 |
| | | | | 705/14.42 |
| 2008/0255944 | A1* | 10/2008 | Shah | H04L 67/306 |
| | | | | 705/14.47 |
| 2010/0042403 | A1 | 2/2010 | Chandrasekar et al. | |
| 2011/0015987 | A1* | 1/2011 | Chakraborty | G06Q 30/02 |
| | | | | 705/14.39 |
| 2011/0054860 | A1 | 3/2011 | Guild et al. | |
| 2011/0125573 | A1* | 5/2011 | Yonezaki | G06Q 30/0242 |
| | | | | 705/14.48 |
| 2012/0078694 | A1* | 3/2012 | Tavares | G06Q 30/0211 |
| | | | | 705/14.13 |
| 2012/0089455 | A1* | 4/2012 | Belani | G06Q 30/0245 |
| | | | | 705/14.44 |
| 2013/0124298 | A1* | 5/2013 | Li | G06Q 30/0241 |
| | | | | 705/14.42 |
| 2014/0180811 | A1* | 6/2014 | Boal | G06Q 30/0207 |
| | | | | 705/14.53 |
| 2015/0149292 | A1* | 5/2015 | Feghali | G06Q 30/0267 |
| | | | | 705/14.64 |
| 2015/0242906 | A1* | 8/2015 | Liu | G06Q 30/0277 |
| | | | | 705/14.71 |
| 2016/0071145 | A1* | 3/2016 | Sanches | H04W 4/14 |
| | | | | 705/14.45 |
| 2016/0225014 | A1* | 8/2016 | Mitra | G06Q 30/0243 |
| 2016/0267527 | A1* | 9/2016 | Flood | G06Q 30/0246 |
| 2016/0285672 | A1* | 9/2016 | Huang | H04L 41/042 |
| 2017/0161773 | A1* | 6/2017 | Xu | G06N 20/00 |
| 2018/0096410 | A1* | 4/2018 | Zhao | G06Q 30/0643 |
| 2018/0158095 | A1* | 6/2018 | Karlsson | G06Q 30/0275 |
| 2019/0164082 | A1* | 5/2019 | Wu | G06Q 50/01 |
| 2019/0182059 | A1* | 6/2019 | Abdou | H04L 12/18 |
| 2020/0160373 | A1* | 5/2020 | Thimmaiah | G06Q 30/0246 |

OTHER PUBLICATIONS

Hsu, Tsuen-ho, et al. "Using the Decomposed Theory of Planned Behaviour to Analyze Consumer Behavioural Intention towards Mobile Text Message Coupons." Journal of Targeting, Measurement and Analysis for Marketing, vol. 14, No. 4, pp. 309-324, Mar. 2006. (Year: 2006).*

International Search Report for PCT/BR2019/050009 dated Mar. 7, 2019.

* cited by examiner

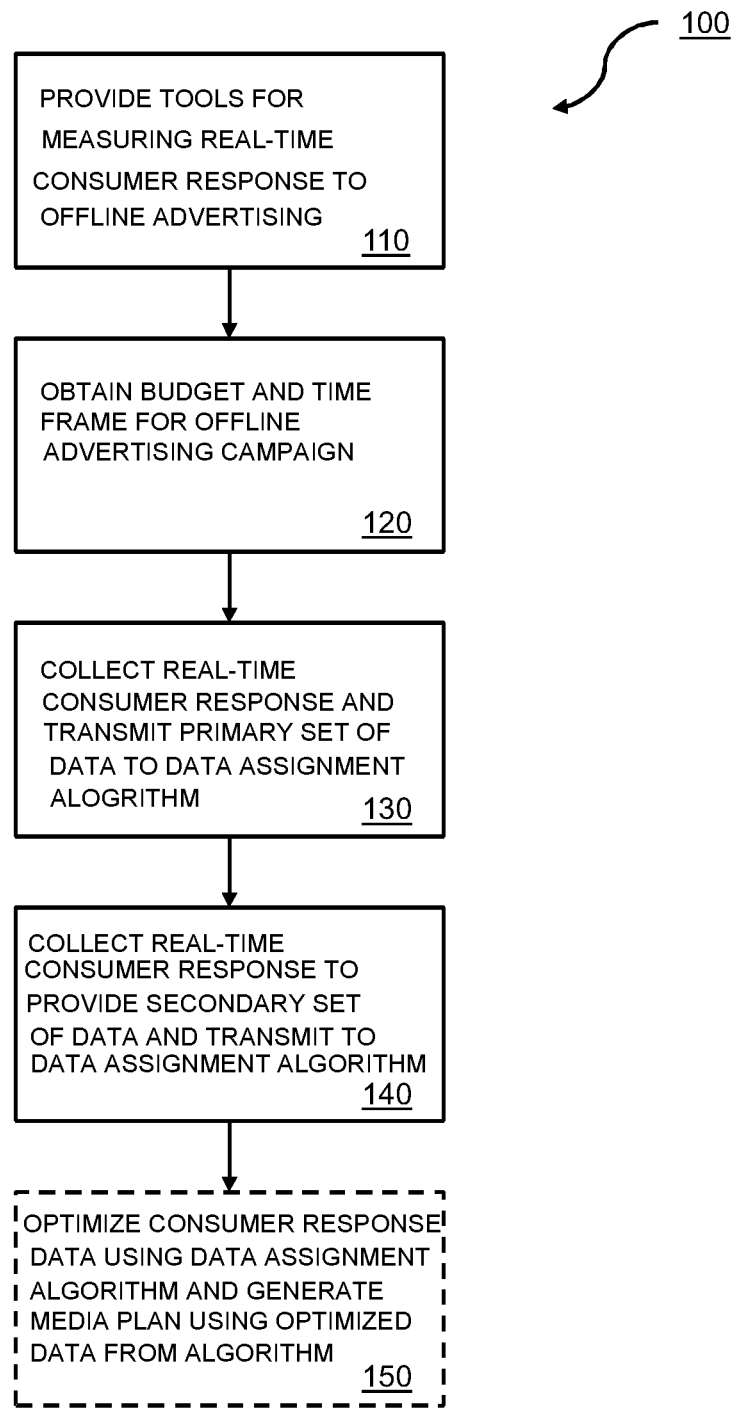

ND FOR PURCHASING
METHOD FOR EVALUATING THE EFFECTIVENESS OF COMMUNICATION, ADVERTISING AND PROMOTIONS IN COMMUNICATION MEDIA, METHOD FOR DEVELOPING OPTIMIZED MEDIA PLANS AND METHOD FOR PURCHASING OPTIMIZED MEDIA

FIELD OF THE INVENTION

The present invention relates to methods for evaluating the efficiency of promotional communication of all natures conveyed in means of communication known as off-line in order to generate data equivalent to those obtainable in means of online communication.

Accordingly, the present invention is in the field of Information Technology and also in the field of Communication using tangible tools such as landlines, cell phones, computers, tablets and any other mobile devices to generate the data that will be applied to much more media plans accurate and efficient than those currently known.

Furthermore, the present invention relates to such a media plan obtainable with said methods.

BACKGROUND OF THE INVENTION

It is known that advertising investment is a very relevant component in the costs of companies that depend on their exposure to make their sales. The result of communication, promotion or advertising depends on the engagement prompted by such actions.

It is now possible to measure or evaluate the engagement of online advertising through analytical tools often used on digital websites and campaigns. Consumer actions are possible to be captured, measured and evaluated in online media. In addition, they can be combined with your social networking profile, for example, or your shopping behavior on online sales sites, resulting in a multitude of data and information useful to advertisers and their advertising agencies.

The same does not happen with offline media. There are no means or methods for capturing and processing engaging consumer data that interest for a particular product or service that is advertised or promoted in such media as television, radio, magazine, newspapers, etc. with the same performance and richness of detail.

Some teachings of the state of the art that refer to this subject are highlighted below.

US 2012078694 describes a system and method which measures the effectiveness of a promotion by employing data collected at points of sale, such as store IDs and the reported promotion Code-driven promotions can be advertised on any media.

US 2008091516 describes a system that includes an advertiser of a subsystem associated with a computer technology application network through the client's advertising campaign server. The responses obtained from the vehicles of interest are stored on the server.

US 2008255944 discloses a system and method for managing multimedia advertising campaigns through online and offline media sources. You use a network identifier associated with each client device you use to access an ad network. This identifier indexes demographic information for users and the device to make it easier to distribute targeted media in the ad network.

US 201 1054860 describes a multidimensional data processing system that stores metadata for identification of variables describing its attributes.

US2010042403 describes a software and/or hard-ware installation to infer user context and delivery of advertisements, such as coupons, using natural language and/or feeling analysis. The facility may infer context information based on an individual's emotional state, attitude, needs, or intention of user interaction with or through a mobile device. Setup can then determine if it is appropriate to deliver an ad to the user and select an ad for delivery. The installation may also determine an appropriate shelf life and/or discount for the ad.

Therefore, in the prior art there is no solution equivalent to set forth herein in the present invention which aligns technical differentials, economic advantages safety and reliability.

OBJECTS OF THE INVENTION

Thus, it is an object of the present invention to provide a method which provides data for analysis of off-line media similar to those currently obtainable for online media.

It is another object of the present invention to provide a method comprising means for analyzing its effectiveness.

It is another object of the present invention to provide a method for producing more assertive media plans for advertisers, i.e., the choice of media, vehicles, programs/session, inserts etc. maximizes engagement for each monetary unit invested.

It is another object of the present invention to provide a method comprising at least one algorithm comprising artificial intelligence tools being preferably of the "automatic learning, machine learning or automatic learning" type.

It is another object of the present invention to provide a method which provides for enhancement, enhancement, and enhancement of the effectiveness of advertising activities in off-line media.

It is another object of the present invention to provide a method which ensures that the investment made in advertising activities in off-line media is as efficient as possible.

SUMMARY OF THE INVENTION

The present invention achieves these and other objects by means of a method for evaluating the efficiency of advertising communication, advertising and promotions in means of communication comprising the following steps:

a) definition of tools for measurement in the medium of campaign communication being offline media;

b) inclusion of tools defined in advertising pieces that will be transmitted in offline media;

c) placement of advertising pieces comprising tools for measurement in off-line media for the general public;

d) collection of feedback data from the general public;

e) treatment of the data captured using specific algorithm being an algorithm of data assignment;

f) generation of primary data.

Furthermore, the present invention achieves these and other objects by means of a method for developing a media plan comprising evaluating the efficiency of advertising communication, advertising and promotions in means of communication comprising the following steps:

a) performance of a method for evaluating the efficiency of communication of advertising, advertising and promotions in the media described above;

b) optionally, combining primary data with secondary data;

c) parameterization of the algorithm comprising the information being selected among customer, market (geography), budget, campaign period and product to be communicated and a combination of these;

d) treatment of the combination of data of (b) and (c) using specific algorithm being a predictive algorithm of media optimization;

e) development of optimization map for media purchase;

f) generation of media plan.

Furthermore, the present invention achieves these and other objects by means of a method for purchasing media comprising the following steps:

a) performing method for developing a media plan comprising evaluating the efficiency of advertising communication, advertising and promotions in the means of communication described above;

b) performance analysis of effectiveness including adherence analysis;

c) development of final media plan;

d) updating of information for continuous monitoring of new campaign;

e) new campaign monitoring.

In addition, the present invention achieves these and other objects by means of media plans obtained with the above methods.

BRIEF DESCRIPTION OF THE DRAWING FIGURE

The drawing FIGURE shows a schematic depiction of the method in accordance with the claimed invention.

DETAILED DESCRIPTION OF THE INVENTION

The attached drawing FIGURE provides a schematic depiction of the method in accordance with the claimed invention, identified as element 100. As set forth herein, the method comprises providing tools for the measurement of real-time consumer response to offline advertising as reflected in element 110, and then the advertiser provides a budget and timeframe for an offline adverting campaign shown as element 120. Once the campaign is started, real-time consumer response data is obtained and transmitted to an algorithm, as shown in element 130, so that a primary set of data is collected. A secondary set of real-time data is also collected and is transmitted to the algorithm as shown in element 140. The real-time data is optimized by the algorithm so as to provide information showing the maximum efficiency of the advertisements with regard to consumer response per monetary unit, and a media plan in generated which provide this optimization information, as shown at element 150.

The present invention relates to three related methods having unique inventive concept.

The first method deals with evaluating the efficiency of advertising communication, advertising and promotions in the media which comprises the following steps:

a) definition of tools for measurement in the medium of campaign communication being offline media desired;

b) inclusion of tools defined in advertising pieces that will be transmitted in offline media;

c) placement of advertising pieces comprising tools for measurement in off-line media for the general public;

d) collection of feedback data from the general public;

e) treatment of the data captured using specific algorithm being an algorithm of data assignment;

f) generation of primary data.

The entire process starts with the initial decision of the vehicle (s), program (s) and program (s) or section (s) who will receive a certain ad in addition to insertion times. This initial decision will be based either on the agency/advertiser's habit and/or on the vehicle's audience data, data from market research etc. Once you decide the schedule grid that will receive a particular ad, it moves to the next step.

It should be noted here that offline media are understood as means of advertising media such as TV, radio, newspapers, magazines, cinemas, billboards, tabloids, newsletters, pamphlets, posters and any other means of promotional communication or advertising related thereto from the internet medium.

Preferred measurement tools are labels selected from phone number, domain name, and mobile digital coupon usage. Such tags are set to obtain response from consumers who will attend certain advertising, preferably being telephone numbers specific domain names, use of mobile digital coupon inserted in a particular advertisement or advertising piece.

In a preferred embodiment, a digital coupon is used through the use of instant messaging such as, for example, WhatsApp, SMS or Messenger. In this case, in particular, the use of instant messaging for digital coupon submission and validation comprises the following steps:

a) Definition of the promotional mechanics by the advertiser. The campaign presents the rule: perform "A" and receive/win "B". For this, it is necessary to define "A" and "B". still, there are other data that must be specified, such as:

i) define the beginning of the promotion (which can be fixed, that is, a starting date for the campaign, or dynamic, ie from tomorrow, for example, generating a new visit to the advertiser's store);

ii) define the promotion/campaign period;

iii) define coupon exchange period and/or coupon validity;

iv) specify quantity of coupons to be sent for each cell phone number.

b) Media configuration considering at least:

i. definition of requisitions, ii. definition of users, iii. vehicles to be used;

iv. promotional mechanics of the Advertiser;

v. which message should be sent to request the coupon;

vi. define coupon text that will be sent to the user comprising information about the start date of the exchange and consequent period as well as unique access code.

The process of using the digital coupon by the user through instant messaging comprises the following steps:

a. The user identifies the promotion of his/her interest in offline and/or digital media;

b. The user requests the coupon after identifying certain promotion of their interest;

c. The user receives the coupon with access code linked to the promotion of interest;

d. The user requests validation of the coupon for online exchange by instantaneous message that occurs in real time (the validation is practically instantaneous);

e. The user is able to take advantage of the chosen promotion;

f. The exchange takes place on the web, over the counter via system integration with integrated POS software with a specific platform that stores the data. Access is given by an employee of the chosen store on the web page destined to do so to enter the data of the access code and minimum identification of the user.

This process has several characteristics and advantages that highlight the traditional processes of coupon validation, such as:

a) Real-time validation;
b) Interaction between physical store and sale software;
c) Employees working on the web 24 hours a day;
d) Integration between sales software with platform;
e) The process is fluid, without bottlenecks and agile;
f) Little data are needed to start the process;
g) The information generated with the application of this process is very useful in the continuity, maintenance and evolution of the process;
h) No installation and use of applications, pre-registration, equipment other than mobile phone, prerequisites.

Consumers watch a certain program on television, for example, and are interested, at some point in time, by an ad that comprises the metering tool, then contacting the advertiser. This contact can be made via landline, computer, cell phone, tablet, physical visit in store, wearable devices, etc. Consumer responses obtained by any of these media/labels are stored result in its real-time analysis. All these data are computed in an integrated way in a single platform, making possible the adequate understanding of the analyzed scenario.

The platform must be unique in that it consolidates all data and analyzes so as to provide reliable, traceable and confirmable returns.

The captured data are treated using specific algorithm being an algorithm of data assignment. Preferably, this algorithm comprises artificial intelligence. More preferably, it is of the "automatic learning, machine learning or automatic learning" type. Thus, the algorithm treats the computed data from all cited sources resulting in the generation of primary data. Therefore, it is data captured and stored in a multidimensional database in which it becomes possible to carry out several types of information cross-fertilization which could not be done otherwise That is why such steps are only feasible to run on a computational device.

These data represent in detail the commitment of consumers to the communication strategy adopted. It reveals its behavior caused by the advertising piece comprising the chosen measuring tool. They are already quite wealthy of information being of great interest to the agents of the sector of communication (advertisers, agencies, vehicles and others).

Such data result in much more than information gathered, being information for management and decision making.

Already, the second method of the present invention relates to a method for developing a media plan comprising evaluating advertising effectiveness in off-line media comprising the following steps:

a) performance of a method for evaluating the efficiency of communication of advertising, advertising and promotions in the media described above;
b) optionally, combining primary data with secondary data;
c) algorithm parameterization comprising the information being among customer, market (geography), budget, campaign period and product to be communicated and a combination of these;
d) treatment of the combination of data of (b) and (c) using specific algorithm being a predictive algorithm of media optimization;
e) development of optimization map for media purchase;
f) generation of media plan.

Secondary data are selected media, consumer and market data from a specific consumer profile and frequency of purchase preferentially. Other data from the media, consumers and the market of interest can also be used in this method.

Preferably, the predictive algorithm for media optimization uses artificial intelligence. Most preferably, the predictive algorithm of media optimization is of the "automatic learning, machine learning or automatic learning" type.

By executing the predictive media optimization algorithm, it is possible to improve the assertiveness of advertising targeting. In this way, it is possible to allocate more effectively the funds allocated to advertising in the offline media in order to increase the concrete engagement and interest of the consumer. By implementing this method, the return on investment in advertising is increased generating more engagement for each monetary unit invested.

Still, such data are useful for influencing the construction of advertising pieces, highlighting definitions regarding format, duration, message, content among others.

With all these data, it is possible to create an optimization map for the purchase of the media, indicating the best choices to be made for the advertising campaign.

Finally, it is possible to generate the media plan with all the decisions made based on the data processed in a predictive algorithm of media optimization.

Further, the third method of the present invention is a method for purchasing media comprising the following steps:

a) performing method for developing a media plan comprising evaluating the efficiency of communication, advertisement and promotions in the media described above (second method);
b) performance analysis of effectiveness including adherence analysis;
c) development of final media plan;
d) updating of information for continuous monitoring of new campaign;
e) new campaign monitoring.

This method comprises a way of evaluating its performance. Such performance is evaluated by the use of performance indicators and process management in order to avoid that the method presents bottlenecks in its execution and also indicates of instantaneous form any difficulty or non-conformity verified during its accomplishment. With the application of process management including performance indicators, it is guaranteed to use offline media as a business development tool in a truly efficient way.

It should be noted that the method for developing a media plan comprising evaluating the efficiency of advertising communication, advertisement, and promotions in the means of communication may be performed in a single or cyclic manner and is preferably cyclical. It is interesting and highly recommended to use the effectiveness analysis to maximize the expected results with such a method.

Performance indicators that may be used, not limited to, are:

Variation in information architecture;
Comparison between distribution of initial and final funding in the media grid;
Comparison between offered and realized media plan, among others.

With all these data, it is possible to continuously and constantly monitor an advertiser's advertising campaigns and take any necessary adjustment measures when identifying any non-compliance.

An example of a preferred embodiment of the present invention has been described. It is to be understood that the scope of the present invention encompasses other possible variations of the inventive concept described, being limited only by the content of the appended claims, including possible equivalents thereto.

The invention claimed is:

1. A method of optimizing the effectiveness of advertising in offline media and generating a media plan containing said information to advertisers desiring to obtain optimized advertising effectiveness as measured by consumer response per monetary unit invested, comprising:
   a) providing a measurement tool for measuring real-time consumer response to an offline advertisement wherein said measurement tool measures real-time consumer response to said offline advertisement by a method selected from the group consisting of tracking hits to a website made by a consumer in response to the offline advertisement, phone calls made b a consumer in response to the advertisement; redemption of a coupon in response to the offline advertisement, and in-store visits in response to the offline advertisement;
   b) communicating with said advertisers desiring to obtain optimized advertising effectiveness so as to obtain a proposed budget and time frame for an advertising campaign;
   c) collecting real-time consumer response data from said measured consumer response following initiation of said advertising campaign to constitute a primary set of real-time consumer response data from said advertising campaign;
   d) providing a data assignment algorithm in order to track said real-time consumer response data and assign said real-time consumer response data to a specific advertisement published during the advertising campaign so that said data assignment algorithm can optimize said data from a specific advertisement on a real-time basis;
   e) continuing to collect real-time consumer response data from said measured consumer response during said advertising campaign to constitute a secondary set of real-time consumer response data from said advertising campaign;
   f) using the data assignment algorithm to process said primary and secondary sets of consumer response data so as to optimize the consumer response data with regard to consumer response per monetary unit spent by the advertiser for each of the advertisements published during said advertising campaign; and
   g) generating a media plan containing said optimized advertising effectiveness obtained from said optimized consumer real-time response data;
   wherein the measurement tool comprises a digital coupon, and wherein the method further comprises:
   a1) requiring the consumer to request the digital coupon;
   b1) defining the advertising campaign with regard to type of advertising;
   c1) defining the beginning of the advertising campaign and the period for which the advertising campaign will take place;
   d1) defining a promotion period during which said digital coupon will be valid;
   e1) specifying the quantity of digital coupons to be sent for each request;
   f1) defining coupon text that will be sent to the consumer comprising information about the start date of coupon exchange, period of the advertising campaign, and access code;
   g1) having the consumer request the digital coupon after identifying a promotion of their interest;
   h1) sending to the requesting consumer the digital coupon with access code linked to the promotion of interest;
   i1) having the requesting consumer also request validation of the digital coupon for online exchange via instant messaging that occurs in real time; and
   j1) having the requesting consumer take advantage of the chosen promotion;
   wherein said online exchange takes place on the web or over a counter via system integration with integrated POS software with a specific platform that stores data reflecting the exchange.

2. The method according to claim 1 wherein the data assignment algorithm for optimizing the effectiveness of advertising in offline media is an artificial intelligence algorithm selected from the group consisting of machine learning artificial intelligence and automatic learning artificial intelligence.

3. The method according to claim 1 wherein the advertising campaign is conducted in an offline media selected from the group consisting of TV, radio, newspapers, magazines, cinemas, billboards, tabloids, newsletters, pamphlets, posters, and offline promotional communications.

4. The method according to claim 1 wherein the measurement tools for measuring consumer response to an offline advertisement comprise tags selected from the group consisting of phone number, domain name, and mobile digital coupon usage, and wherein said the consumer response information data obtained using said tags is transmitted to said data assignment algorithm.

5. The method according to claim 4 wherein the consumer response data measured from said tags includes the particular advertisement or advertising piece from which the consumer response was generated.

6. The method according to claim 1 further comprising providing additional consumer response information selected from the group consisting of customer information, geographic information, budget information, campaign period, and product information to be communicated in said specific advertisement.

7. The method according to claim 1 wherein access is given by an employee of a chosen store on the web in order to enter the data of the access code and identify the requesting consumer.

8. The method according to claim 1 further comprising obtaining an optimization map for tracking purchase of offline advertising and including said optimization map in the generated media plan.

9. A media plan generated by the method of claim 1.

10. A method of maximizing consumer response per monetary unit invested in an offline advertising or promotional campaign comprising:
   a) providing a measurement tool for measuring real-time consumer response to an offline advertising or promotional campaign wherein said measurement tool measures real-time consumer response to said offline advertising or promotional campaign by a method selected from the group consisting of tracking hits to a website made by a consumer in response to the offline advertising or promotional campaign, phone calls made by a consumer in response to the offline advertising or promotional campaign; redemption of a coupon in response to the offline advertising or promotional campaign, and in-store visits in response to the offline advertising or promotional campaign;

b) communicating with said advertisers desiring to maximize consumer response per monetary unit invested so as to obtain a proposed budget and time frame for said offline advertising or promotional campaign;

c) collecting real-time consumer response data from said measured consumer response following initiation of said advertising or promotional campaign to constitute a primary set of real-time consumer response data from said offline advertising or promotional campaign;

d) transmitting said primary set of real-time consumer response data to a data assignment algorithm in order to track said real-time consumer response data and assign said real-time consumer response data to a specific offline advertisement or promotion published during the offline advertising or promotional campaign so that said data assignment algorithm can optimize said data from a specific offline advertisement or promotion on a real-time basis;

e) continuing to collect real-time consumer response data from said measured consumer response during said offline advertising or promotional campaign to constitute a secondary set of real-time consumer response data from said offline advertising or promotional campaign;

f) using the data assignment algorithm to process said primary and secondary sets of consumer response data so as to optimize the consumer response data with regard to maximizing the consumer response per monetary unit spent by the advertiser for each of the offline advertisements or promotions published during said offline advertising or promotional campaign;

g) generating a media plan containing said optimized offline advertising or promotional campaign effectiveness obtained from said optimized consumer real-time response data to said offline advertising or promotional campaign; and h) using said optimized consumer real-time response data so as to maximize consumer response per monetary unit invested to an offline advertising or promotional campaign;

wherein the measurement tool comprises a digital coupon, and wherein the method further comprises:

a1) requiring the consumer to request the digital coupon;

b1) defining the advertising campaign with regard to type of advertising;

c1) defining the beginning of the advertising campaign and the period for which the advertising campaign will take place;

d1) defining a promotion period during which said digital coupon will be valid;

e1) specifying the quantity of digital coupons to be sent for each request;

f1) defining coupon text that will be sent to the consumer comprising information about the start date of coupon exchange, period of the advertising campaign, and access code;

g1) having the consumer request the digital coupon after identifying a promotion of their interest;

h1) sending to the requesting consumer the digital coupon with access code linked to the promotion of interest;

i1) having the requesting consumer also request validation of the digital coupon for online exchange via instant messaging that occurs in real time; and j1) having the requesting consumer take advantage of the chosen promotion;

wherein said online exchange takes place on the web or over a counter via system integration with integrated POS software with a specific platform that stores data reflecting the exchange.

11. The method of maximizing consumer response per monetary unit invested in offline advertising or promotional campaign according to claim 10 wherein said artificial intelligence algorithm is selected from the group consisting of machine learning artificial intelligence and automatic learning artificial intelligence.

12. A method of providing a media plan that optimizes the effectiveness of advertising or promotional communications in offline media to an entity publishing an offline advertisement or promotion desiring to obtain optimized effectiveness of said offline advertisement or promotion as measured by consumer response per monetary unit invested for said advertisement or promotion, said method comprising:

a) providing a measurement tool for measuring real-time consumer response to an offline advertisement or promotion wherein said measurement tool measures real-time consumer response to said offline advertisement or promotion by a method selected from the group consisting of tracking hits to a website made by a consumer in response to the offline advertisement or promotion, phone calls made by a consumer in response to the offline advertisement or promotion; redemption of a coupon in response to the offline advertisement or promotion, and in-store visits in response to the offline advertisement or promotion;

b) communicating with said entity publishing an of advertisement or promotion desiring to obtain optimized effectiveness of said offline advertisement or promotion as measured by consumer response per monetary unit invested for said offline advertisement or promotion so as to obtain a proposed budget and time frame for an offline advertising or promotional campaign including said offline advertisement or promotion;

c) collecting real-time consumer response data from said measured consumer response following initiation of said offline advertising or promotion campaign constitute a primary set of real-time consumer response data from said offline advertising or promotional campaign;

d) transmitting said primary set of real-time consumer response data to a data assignment algorithm in order to track said real-time consumer response data and assign said real-time consumer response data to a specific offline advertisement or promotion published during the advertising or promotional campaign so that said data assignment algorithm can optimize said data from a specific offline advertisement or promotion from said advertising or promotional campaign on a real-time basis;

e) continuing to collect real-time consumer response data from said measured consumer response during said offline advertising or promotional campaign to constitute a secondary set of real-time consumer response data from said advertising or promotional campaign;

f) using the data assignment algorithm to process said primary and secondary sets of consumer response data so as to optimize the consumer response data with regard to consumer response per monetary unit spent by the advertiser for each of the advertisements or promotions published during said advertising or promotional campaign;

g) generating a media plan containing said optimized effectiveness of said specific offline advertisements or promotions published during said advertising or promotional campaign from said optimized consumer real-time response data; and h) providing said media plan to said entity publishing an offline advertisement or promotion desiring to obtain optimized effectiveness of said offline advertisement or promotion as measured by consumer response per monetary unit invested for said offline advertisement or promotion;

wherein the measurement tool comprises a digital coupon, and wherein the method further comprises:

a1) requiring the consumer to request the digital coupon;

b1) defining the advertising campaign with regard to type of advertising;

c1) defining the beginning of the advertising campaign and the period for which the advertising campaign will take place;

d1) defining a promotion period during which said digital coupon will be valid;

e1) specifying the quantity of digital coupons to be sent for each request;

f1) defining coupon text that will be sent to the consumer comprising information about the start date of coupon exchange, period of the advertising campaign, and access code;

g1) having the consumer request the digital coupon after identifying a promotion of their interest;

h1) sending to the requesting consumer the digital coupon with access code linked to the promotion of interest;

i1) having the requesting consumer also request validation of the digital coupon for online exchange via instant messaging that occurs in real time; and j1) having the requesting consumer take advantage of the chosen promotion;

wherein said online exchange takes place on the web or over a counter via system integration with integrated POS software with a specific platform that stores data reflecting the exchange.

13. The method according to claim 12 wherein said artificial intelligence algorithm is selected from the group consisting of machine learning artificial intelligence and automatic learning artificial intelligence.

14. A media plan generated by the method of claim 12.

* * * * *